(12) United States Patent
Scholl

(10) Patent No.: US 8,467,393 B2
(45) Date of Patent: *Jun. 18, 2013

(54) PACKET FLOW OFFLOAD TO REMOTE DESTINATION WITH ROUTING BYPASS

(75) Inventor: Thomas B. Scholl, Seattle, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/459,982

(22) Filed: Apr. 30, 2012

(65) Prior Publication Data

US 2012/0213228 A1 Aug. 23, 2012

Related U.S. Application Data

(63) Continuation of application No. 12/268,005, filed on Nov. 30, 2005, now Pat. No. 8,170,016.

(51) Int. Cl.
*H04L 12/28* (2006.01)
(52) U.S. Cl.
USPC .......................................... 370/392; 370/401
(58) Field of Classification Search
USPC .................. 370/230–235, 389, 392, 400, 401
See application file for complete search history.

(56) References Cited

U.S. PATENT DOCUMENTS

| | | | |
|---|---|---|---|
| 6,981,055 B1 | 12/2005 | Ahuja et al. | |
| 7,079,544 B2 | 7/2006 | Wakayama et al. | |
| 7,254,138 B2 | 8/2007 | Sandstrom | |
| 7,257,119 B2 | 8/2007 | Uttaro | |
| 7,529,254 B2 | 5/2009 | Tsuge et al. | |
| 7,551,627 B2 | 6/2009 | Scholl | |
| 7,751,405 B1 | 7/2010 | Kompella | |
| 2005/0089015 A1 | 4/2005 | Tsuge et al. | |
| 2005/0201302 A1 | 9/2005 | Gaddis et al. | |
| 2005/0262264 A1 | 11/2005 | Ando et al. | |
| 2006/0029035 A1 | 2/2006 | Chase et al. | |
| 2007/0011351 A1 | 1/2007 | Bruno et al. | |
| 2007/0091793 A1 | 4/2007 | Filsfils et al. | |
| 2007/0091911 A1* | 4/2007 | Watanabe et al. | 370/408 |
| 2008/0025218 A1* | 1/2008 | Liu | 370/235 |
| 2008/0285541 A1 | 11/2008 | Van Der Merwe et al. | |
| 2011/0128969 A1 | 6/2011 | Scholl | |

* cited by examiner

*Primary Examiner* — Hong Cho
(74) *Attorney, Agent, or Firm* — Akerman Senterfitt; Michael K. Dixon; Roy Zachariah

(57) ABSTRACT

A network utilizes centralized control for the transport of a packet flow to a destination via an intermediary network. The network identifies the intermediary network best suited for offloading the packet flow and then develops a routing policy based on Multiprotocol Label Switching or other circuit-switching type techniques. This ensures that the packets of the packet flow are automatically forwarded to a peering router connected to the identified intermediary network, and ensures that the peering router automatically outputs the packets of the packet flow to the identified intermediary network in a manner that bypasses autonomous routing decisions by the routers of the network.

20 Claims, 4 Drawing Sheets ated routing decisions based on what the peering router determines to be the best path for each received packet. As a result, routing decisions often are based on what individual peering routers have ascertained about the various possible routes to the destination, thereby making it difficult to efficiently manage the offloading of packet flows to intermediary networks for transport to the intended destination. FIGS. 1-4 illustrate techniques for providing centralized control for the transport of packet flows to a destination by bypassing the autonomous routing decisions made by peering routers. In at least one embodiment, the intermediary network best suited for offloading a packet flow from the originating network for transport to an intended destination is identified and a routing policy is developed based on this identified intermediary network so as to ensure that the packets of the packet flow are routed to the identified intermediary network. The routing policy then can be pushed down to the content/service provider and to the routers of the originating network via a route reflector for implementation within the originating network.

PACKET FLOW OFFLOAD TO REMOTE DESTINATION WITH ROUTING BYPASS

CROSS REFERENCE TO RELATED APPLICATIONS

This application is a continuation of U.S. patent application Ser. No. 12/628,005, entitled "Packet Flow Offload to Remote Destination with Routing Bypass," filed on Nov. 30, 2009, now U.S. Pat. No. 8,170,016, the disclosure of which is hereby expressly incorporated by reference in its entirety.

FIELD OF THE DISCLOSURE

The present disclosure relates generally to data networks, and relates more particularly to communicating data packets between autonomous systems or other data networks.

BACKGROUND

Data networks are used to deliver content and services to end users, as well as to internally transport data within a group of networks. The route between a content provider or service provider and a destination of a given packet flow often can involve multiple networks (also known as autonomous systems). The operators of such networks typically have agreements with each other so as to arrange for the transport of packet flows between an originating network and a destination via one or more intermediary networks. Typically these agreements are "settlement free" in that the data is transferred between networks without requiring financial compensation for the data traffic transmitted by one network on behalf of another network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
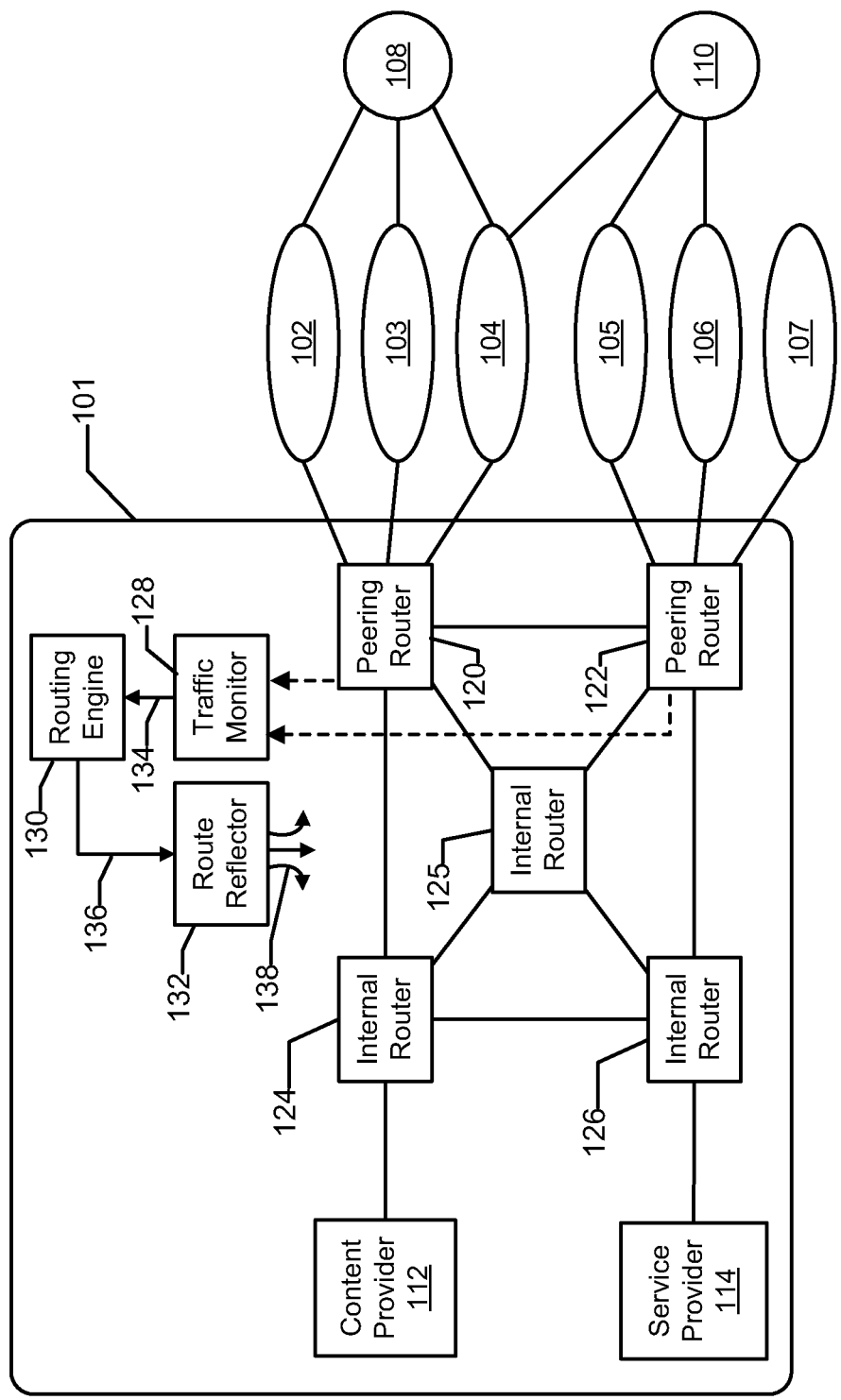
FIG. 1 is a diagram illustrating a system utilizing Multiprotocol Label Switching (MPLS) to bypass autonomous routing decisions so as to facilitate forwarding of a packet flow to a particular intermediary network in accordance with at least one embodiment of the present disclosure.

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Content providers and service providers (referred to herein in the alternate as "content/service providers" or simply "providers") typically seek to offload data to the nearest best performing peer network/autonomous system as fast as possible. However, there often are multiple paths from the originating network of the content/service provider to an intended destination, and the peering routers at the border of the originating network typically are enabled to make autonomous routing decisions based on what the peering router determines to be the best path for each received packet. As a result, routing decisions often are based on what individual peering routers have ascertained about the various possible routes to the destination, thereby making it difficult to efficiently manage the offloading of packet flows to intermediary networks for transport to the intended destination. FIGS. 1-4 illustrate techniques for providing centralized control for the transport of packet flows to a destination by bypassing the autonomous routing decisions made by peering routers. In at least one embodiment, the intermediary network best suited for offloading a packet flow from the originating network for transport to an intended destination is identified and a routing policy is developed based on this identified intermediary network so as to ensure that the packets of the packet flow are routed to the identified intermediary network. The routing policy then can be pushed down to the content/service provider and to the routers of the originating network via a route reflector for implementation within the originating network.

In at least one embodiment, the routing policy makes use of Multiprotocol Label Switching (MPLS). In accordance with the routing policy, the content/source provider is configured to prefix the packets of the packet flow intended for the select destination with a unique MPLS label or other unique identifier. Further, the routing policy provides for the configuration of a selected peering router connected to the identified intermediary network so as to assign the unique MPLS label to each egress interface to the identified intermediary network such that when a packet having the unique MPLS label is received at the peering router, the peering router automatically forwards the packet to the egress interface for transmission to the identified peer network based on the unique MPLS label of the packet and without requiring the performance of an Open System Interconnection (OSI) Layer 3 routing lookup operation for the packet. Further, the routing policy can include the configuration of the non-border routers (identified herein as "internal routers") of the originating network such that the packets having the unique MPLS label are forwarded from the content/service provider to the selected peering router so that they may be output by the selected peering router to the identified intermediary network. In one embodiment, the unique MPLS label is comprised of both an outer MPLS label used by the internal routers to forward the associated packet to the selected peering router and an inner MPLS label used by the selected peering router to forward the associated packet to the corresponding egress interface for output to the identified intermediary network.

While the present disclosure describes routing bypass techniques in an example MPLS-based implementation, these techniques instead may make use of other data carrying mechanisms utilizing other unique identifiers to bypass normal Internet Protocol (IP)-based routing decisions without departing from the scope of the present disclosure.

FIG. 1 illustrates a system implementing routing bypass at border routers for offloading packet flows off-net in accordance with at least one embodiment of the present disclosure. The system includes a plurality of networks 101, 102, 103, 104, 105, 106, and 107 and one or more destinations, such as destinations 108 and 110. In one embodiment, each network is a separate autonomous system (AS) in that it is a collection of connected Internet Protocol (IP) routing prefixes under the control of a network operator and in that it presents a common defined routing policy to a larger network context, such as the Internet. In the depicted example, the network 101 includes, or is otherwise associated with, one or more content providers or service providers, such as content provider 112 and service provider 114. The content provider 112 and service provider 114 are configured to provide data associated with content and services to the destinations 108 and 110. As such, the network 101 serves as the network from which this data originates and thus is identified herein as the "originating network 101." The data sourced by, or otherwise originated in association with, the originating network 101 is transported to a destination via one or more of the networks 102, 103, 104, 105, 106, and 107 and thus those networks are identified herein as "intermediary networks" with respect to the originating network 101. FIG. 1 illustrates an example whereby the destination 108 is reachable via the intermediary networks 102, 103, and 104 and the destination 110 is reachable via the intermediary networks 104, 105, 106, and 107. These destinations of packet flows originated by a provider of the originating network 101 can include individual end-user devices, such as residential gateways, set-top-boxes, or other customer premise equipment. Alternately, a destination can include a host or server on another network, such as a web server or a firewall on the Internet.

The originating network 101 includes a plurality of routers configured to route packet flows for the originating network. The routers of the originating network 101 can include peering routers located topologically at the border of the originating network so as to peer with corresponding peering routers of the intermediary networks 102, 103, 104, 105, 106, and 107. In the illustrated example, the originating network 101 includes a peering router 120 having interfaces connected to corresponding peering routers of intermediary networks 102, 103, and 104 and a peering router 122 having interfaces connected to corresponding peering routers of the intermediary networks 105, 106, and 107. The originating network 101 further includes a plurality of internal routers, such as internal routers 124, 125, and 126, configured to internally route packet flows between the content provider 112, the service provider 114, and the peering routers 120 and 122. Although FIG. 1 depicts a simplified example with only two peering routers and three internal routers for ease of illustration, it will be appreciated that typical implementations will have considerably larger numbers of routers and more complex connection topologies, although the principles described herein will equally apply to such implementations.

The originating network 101 further includes a traffic monitor 128, a destination routing engine 130, and a route reflector 132. The traffic monitor 128 receives network traffic statistics from the peering routers 120 and 122 regarding the statuses of the links between the peering routers 120 and 122 and the intermediary networks 102, 103, 104, 105, 106, and 107, as well as regarding the statuses of the intermediary networks. The network traffic statistics can include, for example, information regarding whether a particular destination is reachable via a corresponding intermediary network, the packet drop rates or other congestion parameters of the intermediary networks, the latency of the intermediary network, customer feedback on the suitability of the intermediary networks, and the like. The traffic monitor 128 filters or otherwise processes the network traffic statistics and provides resulting network status information 134 to the destination routing engine 130. The destination routing engine 130 utilizes the network status information 134 to identify the most appropriate intermediary network for use in offloading packet flows from the originating network 101 to a selected destination. Any of a variety of parameters may be used in determining which intermediary network is best suited for this operation. To illustrate, considerations in choosing the best-suited intermediary network can include: the internal cost of delivering packets to a particular intermediary router; the cost in having a particular intermediary network accept packet traffic on a corresponding link in the event that the carrier agreement is not settlement-free; the latency to the destination via the intermediary network or in other downstream networks in the path via the intermediary network; and the congestion in the intermediary network or in other downstream networks in the path through the intermediary network. Considerations in choosing a particular intermediary network also can be based on factors not directly related to the performance of the intermediary network or a downstream network, such as political or administrative considerations in seeking to avoid forcing an operator of an intermediary network to incur a financial or performance penalty or incur a change in policy or behavior in handling the offloaded packet traffic from the originating network 101.

In one embodiment, the best-suited intermediary network is selected on a destination-basis. That is, the network status information 134 is used by the destination routing engine 130 to identify the intermediary network best suited for all packet flows intended for a particular destination. In another embodiment, the best-suited intermediary network is selected on an individual packet flow-basis. To illustrate, a packet flow provided by the service provider 114 that is intended for receipt by the destination 108 may represent a voice over Internet protocol (VoIP) service and thus have a quality-of-service (QoS) requirement. The determination of the best-suited intermediary network for offloading this packet flow therefore may include particular consideration of the QoS parameters of the intermediary networks 102, 103, and 104. In another embodiment, the best-suited intermediary network is selected on a class-basis, such as for different content types (such as video or audio types), different services (such as simple messaging service (SMS) or VoIP), and the like.

After identifying the best-suited intermediary network for offloading packet flows to a particular destination, the destination routing engine 130 selects a peering router connected to the identified intermediary network to serve as the connection point for the identified intermediary network for offloading packet flows to the particular destination. In the event that there is more than one peering router connected to the identified intermediary network, the selection of a peering router can be based on, for example, the current or expected utilizations of the peering routers, based on the throughputs of the peering routers, or other similar parameters. With the egress route comprising the best-suited intermediary network and associated peering router so identified, the destination routing engine 130 determines a routing policy 136 intended to direct packets of packet flows intended for the particular destination within the originating network 101 to the selected peering router for output to the identified intermediary network. The route reflector 132 then configures the routers and providers of the originating network 101 to implement the routing policy 136. In one embodiment, the originating network 101 utilizes a Border Gateway Protocol (BGP) to manage inter-network routing. Accordingly, the route reflector 132 can use BGP signaling 138 to push BGP updates to the routers and content/service providers of the originating network 101 so as to configure these components of the originating network 101 to implement the identified routing policy. With the routing policy 136 in place, packet flows originating from the content/service providers and intended for the particular destination are routed by the internal routers 124, 125, and 126 to the selected peering router, which then forwards, based on the routing policy 136, the packets of the packet flows to the egress interface connected to the selected intermediary network for transmission to the particular destination.

In one embodiment, the routing policy is implemented through the use of Multiprotocol Label Switching (MPLS) or other similar label-based identifiers that permit circuit-switched-type transport of the associated packet flows in the packet-switched network 101. Multiprotocol Label Switching utilizes labels prefixed to, or otherwise associated with, packets to control forwarding of the packets through a network below the OSI Layer 3 routing decision scheme. To this end, the routing policy can be implemented by configuring the selected peering router such that a unique MPLS label is assigned to the egress interface of the selected peering router that is connected to the identified intermediary network. The routing policy further establishes an MPLS tunnel such that each internal router of the originating network 101 is configured to forward any received packets having the unique MPLS label to the next hop in the MPLS tunnel on the basis of the unique MPLS label and independent of any routing lookup operations based on the IP addresses associated with the packet. Further, the content/service provider sourcing the packet flow intended for the particular destination is configured under the routing policy 136 to prefix the unique MPLS label to the packets of the packet flow before providing the packets to the provider edge (PE) router connected to the content/service provider. Further, as described below in greater detail, the routing policy 136 can make use of two MPLS labels per packet: an inner MPLS label utilized by the receiving peering router to identify the particular egress interface to which the packet is to be output without requiring a routing lookup operation for the packet; and an outer MPLS label utilized by the internal routers for forwarding the packet to the next hop on the prescribed MPLS tunnel to the selected peering router.

By selecting a particular intermediary network for offloading packet flows intended for a particular destination and by implementing a routing policy for the packet flows based on MPLS label switching so as to ensure the packet flows are offloaded via the selected intermediary network, the originating network 101 can bypass autonomous routing decisions that otherwise would have been made by the peering routers. This centralized routing policy allows the offloading of packet flows to other networks to be controlled at the per-interface level, rather than a per-router level as found in conventional networks. As such, the offloading of packet flows can be more effectively controlled based on a centralized view of the network, rather than the more localized (and often less accurate) information available to the peering routers.

Figure 2:
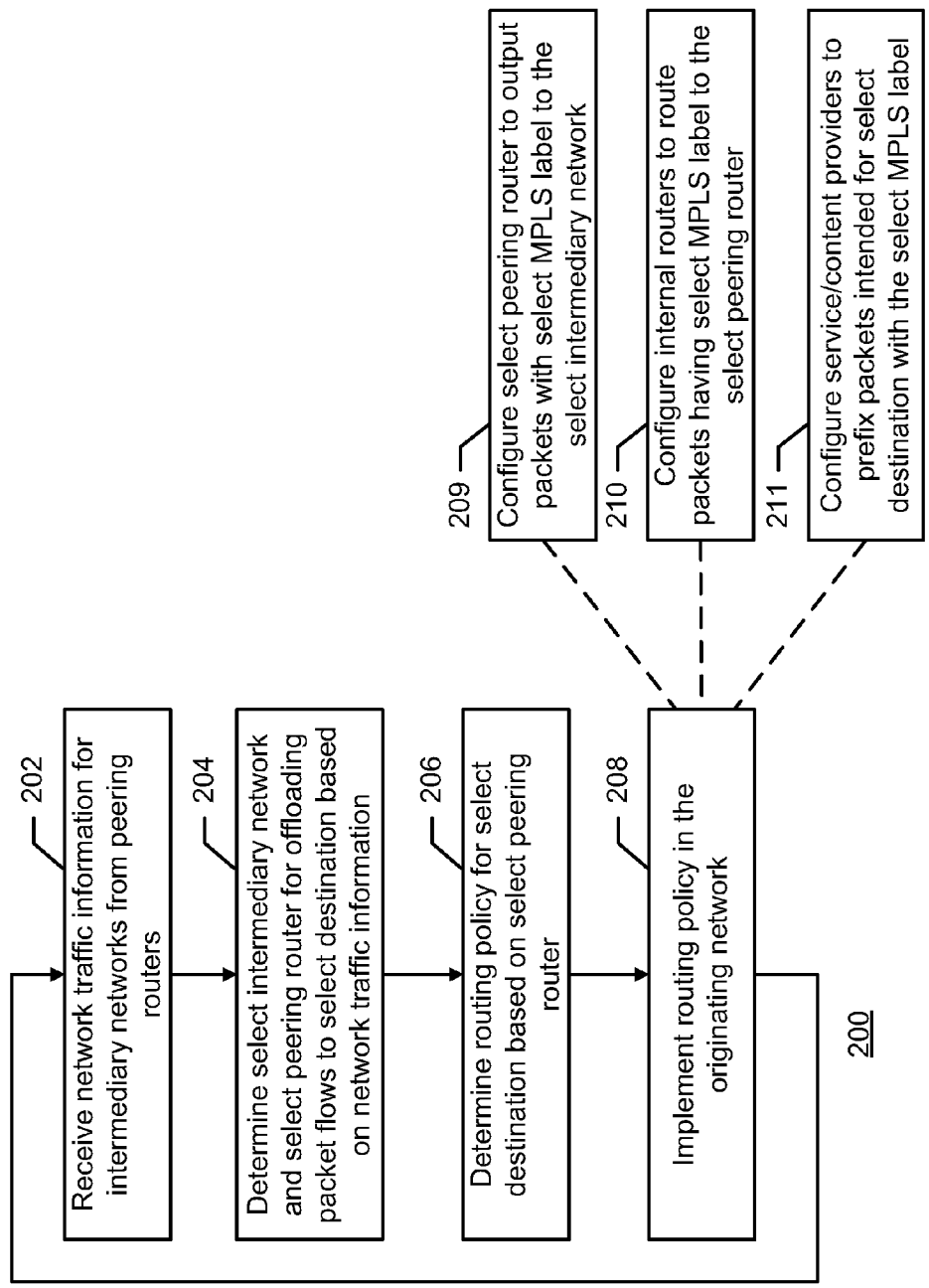
FIG. 2 is a flow diagram illustrating a method for autonomous routing bypass in the system of FIG. 1 in accordance with at least one embodiment of the present disclosure.

FIG. 2 illustrates an example method 200 for offloading packet flows from the originating network 101 of FIG. 1 to an intermediary network in accordance with at least one embodiment of the present disclosure. At block 202, the traffic monitor 128 receives the network traffic statistics from the peering routers at the border of the originating network 101, including network traffic statistics from the peering routers 101 and 102, and the traffic monitor 128 filters or otherwise processes this information to produce the network status information 134 for use by the destination routing engine 130.

At block 204 the destination routing engine 130 uses the network status information 134 to select the intermediary network best suited for offloading the packet flows to a particular destination. To illustrate, as the destination 110 is reachable via intermediary networks 104, 105, 106, and 107, the destination routing engine 130 may select that intermediary network of intermediary networks 104, 105, 106, and 107 having the lowest packet congestion, the lowest traversal time, or based on some combination of one or more selection parameters. After selecting the intermediary network to be used for offloading the packet flows, the destination routing engine 130 selects a peering router in those instances whereby the originating network 101 peers with the selected intermediary network through more than one peering router.

Having selected the intermediary network and the peering router to be used for offloading packet flows to the selected intermediary network, at block 206 the destination routing engine 130 determines a routing policy 136 for the select destination that will cause packets of the corresponding packet flows intended for the select destination to be forwarded to the select peering router, and further will ensure that the selected peering router forwards the received packets of the packet flow to the selected intermediary network. At block 208, the routing engine 130 forwards data representing the routing policy 136 to the route reflector 132. In turn, the routing engine 130 uses BGP signaling 138 to perform BGP updates with the routers and providers of the originating network 101 so as to implement the routing policy 136.

As described above, the routing policy 136 can be implemented through the use of MPLS label switching or other sub-OSI Layer 3 switching using unique identifiers. As illustrated in FIG. 2, the routing policy implementation process of block 208 can include the route reflector 132 or other network component configuring, at block 209, the select peering router to assign a unique MPLS label to its egress interface that is connected to the selected intermediary network such that any received packets that have the unique MPLS label are automatically forwarded to the egress interface, and thus automatically output to the selected intermediary network, without performing or requiring a IP-based routing lookup operation by the selected peering router in determining which egress interface to use for the packet. The routing policy implementation process of block 208 also can include the route reflector 132 or other network component configuring, at block 210, the internal routers of the originating network 101, or an appropriate subset thereof, so as to set up an MPLS tunnel to the selected peering router whereby the internal routers are configured to forward any data packets having the unique MPLS label to the selected peering router. The routing policy implementation process of block 208 further includes the route reflector 132 or other network component configuring, at block 211, the providers sourcing the packets of the packet flows so that the providers prefix the unique MPLS label to the packets of the packet flows in order for the packet flows intended for the select destination to make use of the MPLS label forwarding configuration of the routers of the originating network 101. As discussed above, the unique MPLS label can be implemented using both an inner MPLS label and an outer MPLS label, whereby the outer MPLS label is used by the internal routers in forwarding the corresponding packets to the selected peering router and the inner MPLS label is used at the selected peering router to identify the corresponding egress interface to which the packets are to be forwarded to for output. Thus, by implementing MPLS labels to override the OSI Layer 3 routing decisions that otherwise would be autonomously made by the peering routers and internal routers, the originating network 101 can ensure that packet flows intended for a particular destination are off-loaded to a particular intermediary network identified through a centralized decision-making process as being the intermediary network best suited to handle the transport of the packet flows to the intended destination.

Figure 3:
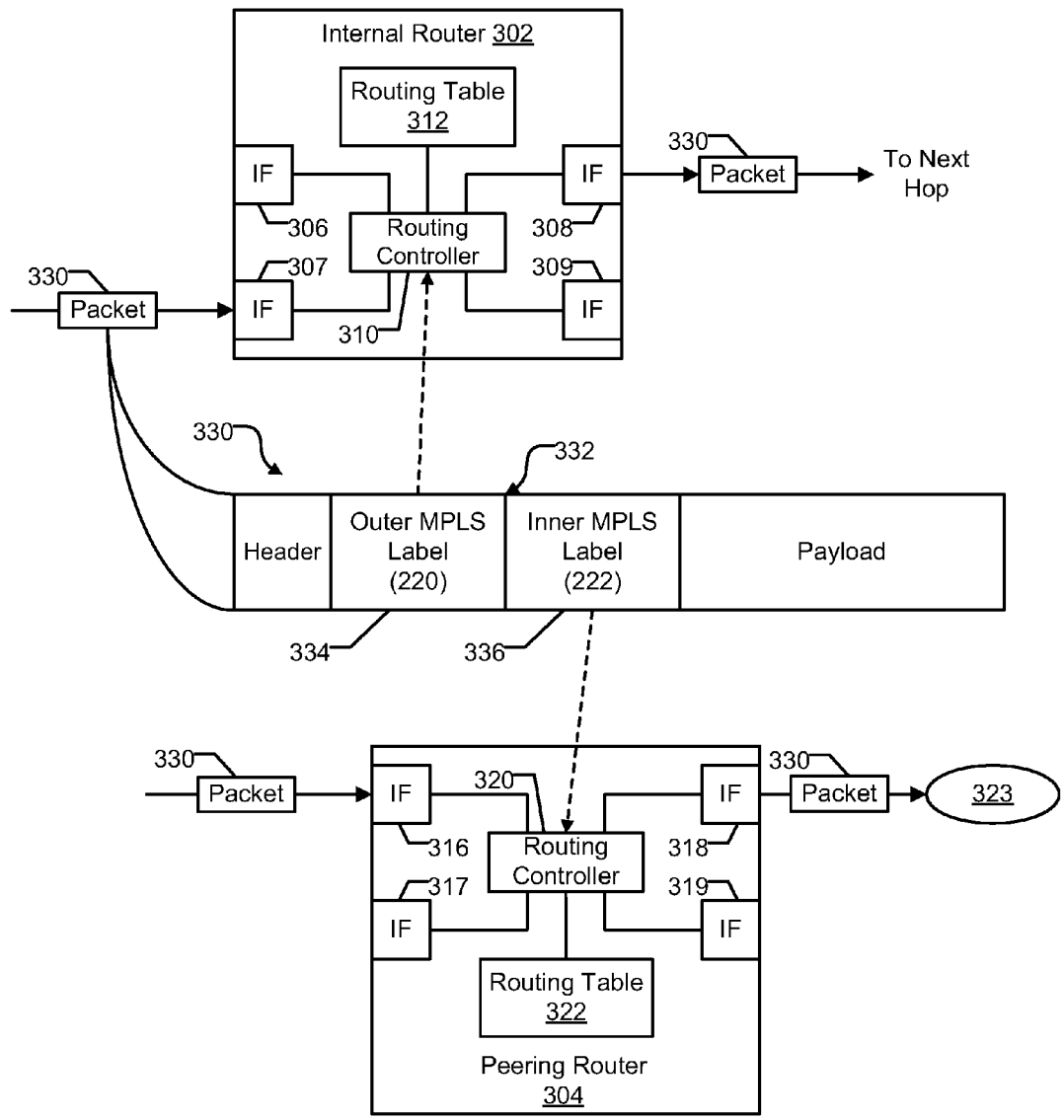
FIG. 3 is a diagram illustrating an example of a process for handling a packet implementing an MPLS label at an internal router and at a peering router in accordance with at least one embodiment of the present disclosure.

FIG. 3 illustrates example operations of an internal router 302 and a peering router 304 in an originating network in accordance with the techniques described herein. In the depicted example, the internal router 302 (corresponding to internal routers 124, 125, and 126 of FIG. 1) includes ingress interfaces 306 and 307, egress interfaces 308 and 309, a routing controller 310 and a routing table 312. The ingress interfaces 306 and 307 may be connected to other internal routers, to providers, or to other network components depending on the position of the internal router 302 in the topology of the originating network. The egress interfaces 308 and 309 may be connected to other internal routers, to peering routers, or to other network components, again depending on the particular position of the internal router 302 in the topology of the originating network. The peering router 304 likewise includes ingress interfaces 316 and 317 connected to corresponding internal routers or other network components, egress interfaces 318 and 319 connected to respective intermediary networks, a routing controller 320, and a routing table 322.

For a received packet without an MPLS label associated with an implemented routing policy, the routing controller 310 of the internal router 302 performs a routing lookup operation into the routing table 312 using the destination IP address and next-hop IP address of the received packet to make an autonomous Layer 3 routing decision as to which of the egress interfaces 308 or 309 the packet should be output for transmission to its next hop. The routing controller 320 of the peering router 304 is similarly configured to perform an autonomous Layer 3 routing decision using the routing table 322 for packets received at the ingress interfaces 316 and 317 and which do not have an MPLS label associated with an implemented routing policy.

For the purposes of the illustrated example, the internal router 302 has been configured to forward packets having an outer MPLS label of "220" to the peering router 304, and the peering router 304 has been configured to assign its egress interface 318 for the output of packets having an inner MPLS label of "222" to an identified intermediary network 323 so as to implement an example of the routing policy 136 described above. Accordingly, in the event that a packet 330 having a unique MPLS label 332 associated with an implemented routing policy is received at the internal router 302, the routing controller 310 accesses an outer MPLS label field 334 of the packet 330 to determine whether the outer MPLS label has a value of "220." If so, the routing controller 310 forwards the packet 330 to the egress interface 308, which in this example has been identified as the egress interface for forwarding such packets to the peering router 304. In at least one embodiment, this operation is performed at a switching level and thus is independent of any IP-based routing lookup operation into the routing table 312. In forwarding the packet 330, the routing controller 310 can remove, or "pop" the outer MPLS label 334 off the packet 330 so that an inner MPLS label field 336 is the only remaining MPLS label field in the packet. In a similar operation, when the packet 330 is received at the peering router 304, the routing controller 320 accesses an inner MPLS label field 336 to determine whether the MPLS label contained therein has a value of "222." If so, the routing controller 320 forwards the packet 330 to the assigned egress interface 318 for output to the intermediary network 323. This forwarding process may be automated at a sub-Layer 3 level such that the routing controller 320 does perform any IP-based routing lookup operation into the routing table 322 in forwarding the packet 330 to the egress interface 318 when the inner MPLS label is determined to have the value of "222." As such, the routing policy 136 can utilize MPLS label switching to ensure that packet flows intended for a particular destination are automatically forwarded to a selected peering router connected to a select intermediary network without being subjected to the autonomous routing decisions otherwise made by the internal routers of the originating network, and further to ensure that the packet flows received by the selected peering router are automatically forwarded to the selected intermediary network without being subjected to the autonomous routing decisions that otherwise would be made by the peering router based on Layer 3 routing information.

Figure 4:
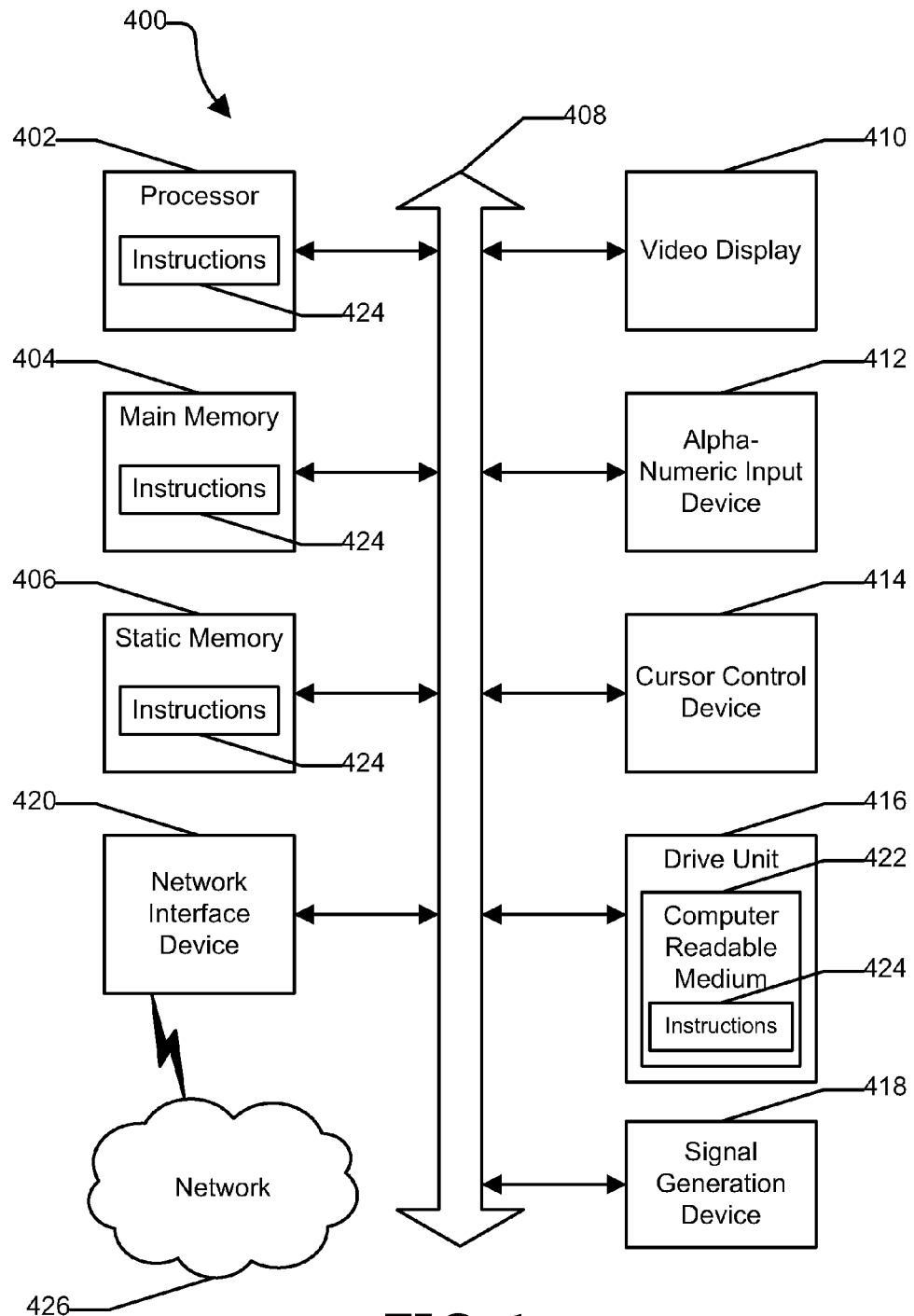
FIG. 4 is a diagram illustrating an example computer system for implementing one or more of the components or techniques described herein in accordance with at least one embodiment of the present disclosure.

FIG. 4 shows an illustrative embodiment of a general computer system 400 in accordance with at least one embodiment of the present disclosure. The computer system 400 can include a set of instructions that can be executed to cause the computer system 400 to perform any one or more of the methods or computer-based functions described above. The computer system 400 may operate as a standalone device or may be connected via a network to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into, for example, a STB device. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission such as TCP/IP, UDP/IP, HTML, and HTTP represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   selecting for a packet of traffic in route through a first network, according to a policy of the first network:
      a second network, wherein a destination of the packet is reachable from the second network;
      a peer router of the first network from multiple peer routers of the first network with egress interfaces connected to the second network; and
      an egress interface of the selected peer router;
   labeling the packet, by utilizing instructions stored in memory and executed by a processor, with a label by a provider associated with a first network, wherein the provider provides packets of a packet flow of the first network; and
   routing the packet of traffic to the selected egress interface based upon the label, wherein a first portion of the label specifies the selected egress interface of the selected peer router and a second portion of the label specifies the selected peer router.

2. The method of claim 1, wherein the selecting the egress interface comprises selecting the egress interface from a plurality of egress interfaces of the selected peer router connected to the second network.

3. The method of claim 2, wherein:
the provider is contained in the network; and
the routing comprises routing the packet of traffic from the provider to the selected egress interface of the selected peer router based upon the labeling and without using any other header information of the packet of traffic.

4. The method of claim 1, wherein the labeling comprises placing a multiprotocol label switching label on the packet of traffic.

5. The method of claim 1, wherein:
the label is a multiprotocol label switching label;
the first portion of the label is an inner multiprotocol label switching label; and
the second portion of the label is an outer multiprotocol label switching label.

6. The method of claim 1, further comprising:
configuring internal routers of the first network to forward packets having the label to the selected peering router;
configuring the selected peering router to forward packets having the label to the selected egress interface; and
configuring the provider to associate the label with packets intended for the destination of the packet of traffic.

7. The method of claim 1, wherein the selecting is selecting the second network, the peer router, and the egress interface of the peer router on an individual packet flow basis.

8. The method of claim 1, wherein the selecting is selecting the second network, the peer router, and the egress interface of the peer router based upon quality-of-service requirements.

9. The method of claim 1, wherein the selecting is selecting the second network, the peer router, and the egress interface of the peer router on a class basis, wherein the class is a content type or a service type.

10. A network comprising:
a plurality of peering routers respectively connected to a plurality of intermediary networks;
a plurality of interconnected internal routers connected to the peering routers;
a traffic monitor to obtain network traffic information regarding the intermediary networks from the peering routers;
a destination routing engine configured to determine a select route for routing packets to a destination external to the network based on the network traffic information, the select route including:
a select intermediary network of the intermediary networks determined based on the network traffic information;
a select peering router of the peering routers that is connected to the select intermediary network; and
a select egress interface of the select peering router that is connected to the select intermediary network; and
a route reflector to configure the select peering router to forward packets having a select identifier to the select egress interface of the select peering router, and to configure the internal routers to forward packets having the select identifier to the select peering router, wherein:
the forwarding by the internal routers is forwarding based upon the select identifier and independent of routing decisions based upon internet protocol addresses associated with the rackets having the select identifier; and
the select identifier is associated with the select route,
the select identifier comprises a first label and a second label, the first label being associated with the select peering router and the second label being associated with the select egress interface;
the route reflector configures the internal routers to forward packets having identifiers with the first label to the select peering router;
the route reflector configures the select peering router to forward packets having identifiers with the second label to the select egress interface; and
a provider that provides packets of a packet flow intended for transmission to the destination, wherein the route reflector further is to configure the provider to associate the select identifier with the packets of the packet flow, wherein the route reflector is to configure the provider to prefix both the first label and the second label to the packets of the packet flow.

11. The network of claim 10, wherein the route reflector configures the select peering router and configures the internal routers via a border gateway protocol update.

12. The network of claim 10, wherein the destination routing engine selects the select intermediary network from the intermediary networks based on the network traffic information.

13. The network of claim 10, wherein the route reflector configures the select peering router to forward packets having the select identifier to the egress interface without performing routing lookup operations for the packets.

14. The network of claim 10, wherein the select identifier comprises a select multiprotocol label switching label.

15. A network comprising:
a memory that stores instructions;
a processor that executes the instructions to perform operations comprising:
selecting for a packet of traffic in route through a first network, according to a policy of the first network:
a second network, wherein a destination of the packet is reachable from the second network;
a peer router of the first network from multiple peer routers of the first network with egress interfaces connected to the second network; and
an egress interface of the selected peer router;
labeling the packet, by utilizing instructions stored in memory and executed by a processor, with a label by a provider associated with a first network, wherein the provider provides packets of a packet flow of the first network; and
routing the packet of traffic to the selected egress interface based upon the label, wherein a first portion of the label specifies the selected egress interface of the selected peer router and a second portion of the label specifies the selected peer router.

16. The network of claim 15, wherein the operations further comprise selecting the egress interface from a plurality of egress interfaces of the selected peer router connected to the second network.

17. The network of claim 16, wherein the provider is contained in the network; and wherein the operations further comprise routing the packet of traffic from the provider to the selected egress interface of the selected peer router based upon the labeling and without using any other header information of the packet of traffic.

18. The network of claim 15, wherein the labeling comprises placing a multiprotocol label switching label on the packet of traffic.

19. The network of claim 15, wherein the operations further comprise:
- configuring internal routers of the first network to forward packets having the label to the selected peering router;
- configuring the selected peering router to forward packets having the label to the selected egress interface; and
- configuring the provider to associate the label with packets intended for the destination of the packet of traffic.

20. The network of claim 15, wherein the operations further comprise selecting the second network, the peer router, and the egress interface of the peer router based upon quality-of-service requirements.

* * * * *